INVENTOR.
WILLIAM L. JACKSON
BY
ATTORNEY

United States Patent Office 3,432,240
Patented Mar. 11, 1969

3,432,240
LASER OPTICAL ALIGNING METHOD
AND APPARATUS
William L. Jackson, Hayward, Calif., assignor to the
United States of America as represented by the United
States Atomic Energy Commission
Filed Mar. 28, 1966, Ser. No. 538,916
U.S. Cl. 356—152                                    4 Claims
Int. Cl. G01b 11/26

ABSTRACT OF THE DISCLOSURE

Apparatus for aligning optical laser systems to obtain optimum light amplification from said systems whereby a maximum of coherent light is utilized and there is no necessity for visual approximation to be made by an operator. An electrical current is generated in response to an optimum alignment of said systems.

---

The invention disclosed herein was made in the course of, or under, Contract W-7405-ENG-48 with the United States Atomic Energy Commission.

The present invention relates generally to optical laser systems, and more specifically to a particularly advantageous method of alignment thereof wherein a separately generated aligning laser beam is transmitted and returned through the system to be aligned to provide a maximal transmitted energy signal.

Laser systems today generally contain one or more reflective, polarizing or refractive elements operating in combination with a coherent beam of light emanating from a laser, the laser beam either passing through or being reflected from the elements. It is frequently desirable to position these various elements in such a way that power losses due to attenuation of the laser beam while traversing the elements will be kept to a minimum.

Previous methods of aligning laser systems have consisted usually of directing either a laser beam or a highly directional collimated light beam through the system and determining visually when the individual system components seemed to be aligned for optimum beam transmission. Observations of discrepancies from this optimum system alignment depended primarily on the subjective judgment or the visual and manual dexterity of the operator aligning the system. This subjective method of alignment is often quite disadvantageous when attempting to align laser systems having an optical path length of less than 2–3 meters, since even comparatively gross misalignments of reflecting mirrors, prisms, beam splitters, etc. may result in only a slight, difficult to detect, spatial displacement of the transmitted light beam. Frequently, even a highly accurate spatial alignment (as determined visually) of a laser beam traveling through such a system may not necessarily correspond to the maximum attainable power the system is capable of delivering.

Another method commonly used to align a laser system involves arranging the system's components such that when a gas laser or collimated light beam is directed through this system and then reflected back upon itself, the incident and reflected beams will coincide, thus indicating an optimum alignment of the system's components. Typically, this system might consist of the aforementioned gas aligning laser and a reflecting mirror with a quiescent ruby laser and various reflecting, polarizing, refracting, etc., elements positioned therebetween. Upon activating the gas laser, these elements are adjusted until the beam reflected back from the ruby laser system's components is observed on a viewing plate situated directly in front of the gas laser and perpendicular its axis. An aperture located in this viewing plate is disposed along the axis of the gas laser to admit the incident laser beam from the gas laser into the ruby laser system. The ruby laser system is then aligned by adjusting its individual components until the gas laser beam incident upon the elements is reflected directly back upon itself and into the aperture. Unfortunately, it is difficult to precisely center the returned gas laser beam directly within this aperture since displacement of the beam interiorly of the aperture is difficult to detect visually.

In contrast to the prior art and as a solution to the problems just outlined, the present invention provides an accurate and reliable method and an apparatus for aligning a laser system. The apparatus of the invention includes means such as a gas laser coherent light generator having a photointensity measuring element associated therewith of precisely defined angular beam acceptance area disposed, e.g., at the rear of the gas laser for use in determining the correct alignment of a separate laser system. A laser beam from the gas aligning laser is directed toward or through one or more of the transmissive or reflective components of the separate laser system and reflected back upon itself when proper alignment of the individual components of the entire separate system has been effected upon sequential manipulation and adjustment thereof This returned laser beam will then enter the gas aligning laser and strike the photointensity measuring element causing a maximum reading to appear at a power or intensity meter attached to the element indicating thereby optimum alignment of the separate laser system.

Accordingly, it is an object of the invention to provide a more reliable means for determining and controlling the optimum alignment and hence optimum amplification of a laser system.

Another object of the present invention is to provide an improved method of aligning a laser system whereby a maximum of coherent light will be amplified and transmitted by the system.

Another object of the present invention is to provide a reliable means of aligning a laser system wherein the necessity for visual approximations made by an operator are eliminated.

A further object of the present invention is to provide instrumental means for electrically detecting the optimum optical alignment of a laser system.

A still further object of the present invention is to provide an alignment method of the character described above wherein an electrical current is generated in response to an optimum alignment of the laser system.

These and other objects of the present invention will be evident from the following description taken in conjunction with the accompanying drawing, of which:

The laser system alignment indicator of the invention includes, as mentioned above, a *bi-directional* transparent gas laser or similar light generator means adapted for emission of a coherent light beam which can be reflected back upon itself through the coherent light generator to impinge precisely upon a photointensity indicator appended to the rear of the coherent light generator.

Figure 1:
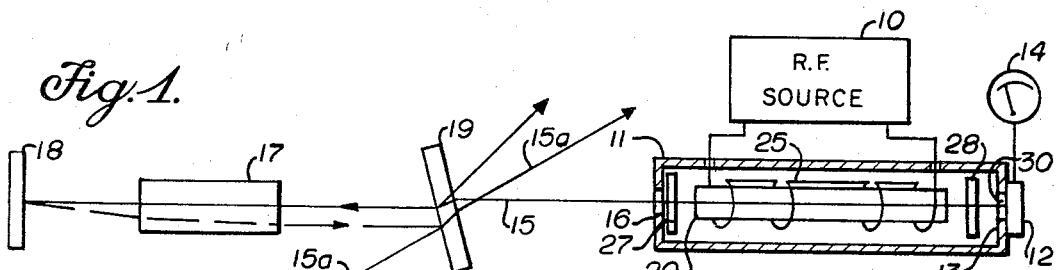
FIGURE 1 is a schematic illustration of the apparatus of the present invention disposed for the alignment of a separate laser system.

With reference to FIGURE 1, there is shown such a coherent light generator including and R–F power source 10 and a helium-neon gas aligning laser assembly within an elongated housing 11, e.g., a 15 mw. Spectra Physics Model 115 gas laser with a 40.68 megacycle R–F power source. In accordance with the present invention, there is mounted at the rear extremity 13 of housing 11 a sensor element of a photointensity indicator means, e.g., a photodiode 12 or similar device, electrically connected to a 0–15 milliwatt meter 14, suitably responsive to power fluctuations indiced in photodiode 12 by a laser beam 15 generated within the helium-neon gas tube 20 disposed in housing 11. Electrical power as measured by the milliwatt meter 14 will be directly proportional to the intensity of the laser beam 15 striking the photodiode 12. The size of the orifice 30 located at the rear end 13 of housing 11 will determine the angle of divergence of the returned beam that can be tolerated, and therefore the precision of alignment. A small orifice connotes a small angle of divergence and greater precision than would a large orifice. Other means defining the photosensitive area, equivalently, e.g., a diode of small area similar to the cross sectional area of the laser beam, etc., can also be used in place of an orifice.

Actuation of the gas laser is achieved, typically, by supplying exciting R–F energy to the helium-neon gas within tube 20 via a conventional primary current wire loop 25 connected to the R–F power source 10, and disposed in encircling coupled relation to the said tube 20. As energy within the helium-neon gas of the gas tube 20 builds up, coherent light will be generated and oscillate between the two stationary partially reflecting mirrors 27 and 28 disposed in housing 11 at opposite ends of tube 20, prior to its spontaneous emergence through the mirrors in typical laser fashion. Mirror 27 disposed in spaced relation to housing 11 is made slightly less reflective than the mirror 28 located proximate the rear end 13 of the laser housing 11, and consequently the lser beam 15 emitted through the front end 16 of the laser housing 11 will be slightly more intense than the same beam 15 leaving the orificed rear end 13 of laser housing 11 and striking the photodiode 12 appended to housing 11.

Figure 2:
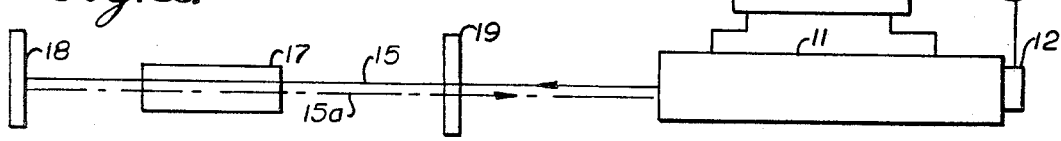
FIGURE 2 is a schematic illustration of the laser system shown in FIGURE 1; however, now with components in optimum alignment.

For utilizing the foregoing indicator device in accordance with the invention, the gas laser beam 15 emerging through the front end 16 of gas laser housing 11 is directed and transmitted toward a separate optical laser system to be aligned illustratively comprising the elements 17, 18 and 19 of FIGURE 1. A typical laser system to be aligned may comprise a ruby laser rod 17, having a totally reflecting mirror 18 in spaced relation to the forward end, and a partially reflecting mirror 19 in spaced relation to the rearward end of rod 17, as illustrated in FIGURE 1. Since the reflecting mirrors 18 and 19 constitute the boundary surfaces between which light from the stimulated ruby 17 oscillates prior to its spontaneous emergence through the partially reflecting mirror 19, it is imperative that the reflecting surfaces of these mirrors 18 and 19 be aligned perpendicular to the optical axis of the ruby laser 17. In accordance with the method of the present invention, the gas laser beam 15 is directed through the separate laser system composed of elements 17, 18 and 19 to be returned back upon itself with maximum intensity when the elements 17, 18 and 19 are properly aligned as indicated by a consequent maximum power reading at milliwatt meter 14 as shown in FIGURE 2. For purposes of clarity, the reflected gas laser beam 15a has been depicted in FIGURE 2 as displaced from the incident gas laser beam 15; however, it should be understood that this reflected beam 15a will in reality be returned directly back upon beam 15 when the separate laser system is properly aligned.

More specifically, the method of alignment advantageously provided by the present invention comprises first aiming the laser beam 15 emanating from the gas laser housing 11 as illustrated in FIGURE 1 in the direction of a first element of the system, e.g., the totally reflecting mirror 18, with the intermediate laser system elements, ruby laser 17 and the partially reflecting mirror 19, normally positioned therebetween, temporarily removed. Mirror 18 is then adjusted until the returned gas laser beam 15a coincides exactly with the incident laser beam 15 emerging through the orifice 30 at the rear end 13 of housing 11. This condition is indicated by a maximum power reading at milliwatt meter 14. With mirror 18 properly positioned relative to laser beams 15 and 15a, the ruby laser rod 17 is then inserted into the laser beam paths 15 and 15a and aligned either manually or by manipulation of the mount devices generally employed to return a maximum of coherent light to the photodiode 12. It should be noted that the maximum power reading appearing at milliwatt meter 14 with the ruby laser 17 inserted into the system may in fact be less than a similar reading with ruby laser 17 removed from the system and only the reflecting mirror 18 remaining. This circumstance is caused by attenuation losses created in laser beams 15 and 15a by the ruby laser rod 17. Finally, the partially reflecting mirror 19 is interposed between ruby laser 17 and the gas aligning laser housing 11 as shown in FIGURES 1 and 2. In the nonaligned position of mirror 19 as illustrated in FIGURE 1, the returned gas laser beam 15a will be diverted from the path of the incident gas laser beam 15 and hence will not impinge on the photodiode 12. When mirror 19 is aligned properly as illustrated in FIGURE 2, maximum power will be generated by the photodiode 12; however, again, due to attenuation losses resulting from the reflection and transmission of the laser beams 15 and 15a by mirror 19 and ruby laser 17, this maximum power may be of lesser magnitude than that produced by the same system with elements 17 and 19 removed; however, a distinct peak reading will be obtained in either case.

Figure 3:
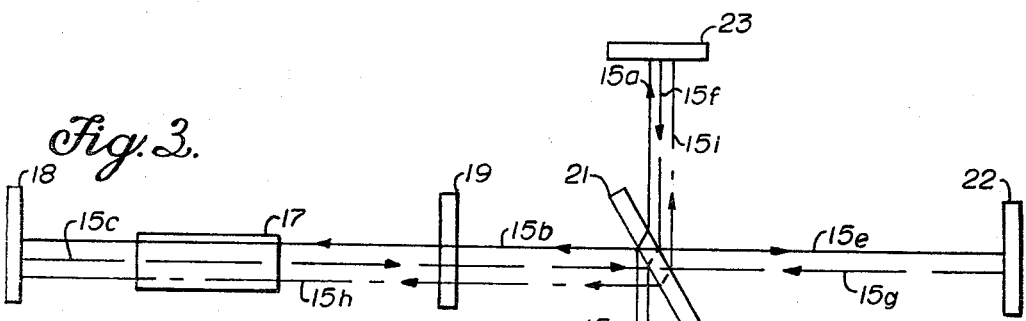
FIGURE 3 is a plan view of the laser system depicted in FIGURE 2, with the addition of a beam splitter and two separate reflecting mirrors positioned as shown.

An alignment problem more frequently encountered than that of the simple linear array discussed above involves laser system components that are disposed in nonlinear or offset positions. One such possible system is illustrated in FIGURE 3, where a beam splitter 21 and the two totally reflecting mirrors 22 and 23 have been incorporated into the laser system of FIGURE 2 and the gas aligning laser 11 has been rotated to a new position 90° clockwise of its previous location in FIGURE 2. Since most laser work today involves the use of beam splitters, the present aligning method has particular importance in this area. FIGURE 3 represents a laser system composed of elements 17, 18, 19, 21, 22 and 23 arranged in optimum alignment, and it should again be understood that laser beam path segments 15, 15a, 15b . . . , 15i, do in fact represent a single laser beam path, but are shown separated in the drawing for purposes of illustration to simplify explanation.

The laser beam emerging along beam path 15 from the gas aligning laser is directed toward the beam splitter 21. A portion of beam 15 is refracted by the beam splitter 21 and transmitted along beam path 15a in the direction of mirror 23, the remainder of beam 15 is reflected along path 15b in the direction of the ruby laser system components 17, 18 and 19. The alignment of the ruby laser system is effected substantially as described supra. The reflected laser beam returning along path 15c from the aligned ruby laser system components 17, 18 and 19 will strike the beam splitter 21 and be partially reflected along path 15d into the gas aligning laser, producing a correspondingly maximum power reading at milliwatt meter 14. The remainder of the returned laser beam traveling along path 15c is refracted at beam splitter 21 and transmitted along beam path 15e in the direction of reflecting mirror 22. It should be noted that the reflecting mirrors 22 and 23 of FIGURE 3 need not be in position during the aligning process just cited. Reflecting mirror 23 is aligned by adjusting it until the impinging laser beam traveling along path 15a is returned back upon itself into photodiode 12 via laser beam paths 15f and 15d as indicated by a maximum power reading at milliwatt meter 14. It will be observed that this power reading will be of greater magnitude than the reading produced while aligning the ruby laser system components 17, 18 and 19, with mirrors 22 and 23 removed, but a peak reading indicating alignment is obtained in either case.

Finally, to align mirror 22, it will be recalled that a portion of the laser beam returning along beam path 15c from the ruby laser system components 17, 18 and 19 is refracted at beam splitter 21 and transmitted in the direction of mirror 22 along beam path 15e. This beam component will combine now with the portion of the laser beam returned from mirror 23 to mirror 22 via beam paths 15f and 15e. Again, alignment is effected by positioning mirror 22 such that the impinging laser beam traveling along beam path 15e will be returned back upon itself into gas laser tube 20 and subsequently photodiode 12, thereby resulting in a maximum or peak power reading at milliwatt meter 14. This returned laser beam (from mirror 22) traveling along beam path 15g is intercepted by beam splitter 21 and broken into two components. One component is refracted at beam splitter 21 and travels along beam path 15h toward mirror 18, at which location it is totally reflected back along beam path 15c in the direction of beam splitter 21, experiencing at this laser system component a second reflection resulting in its transmission into the gas aligning laser housing 11 via beam path 15d. The second component of beam 15g will experience reflection at beam splitter 21 in the direction of mirror 23 along beam path 15i until the beam is intercepted by mirror 23 and reflected back into the gas aligning laser housing 11 via beam paths 15f and 15d. Again, the maximum or peak power output induced at photodiode 12 due to the aligned mirrors 22 and 23 and the aligned ruby laser system components 17, 18 and 19, will be greater than that power output induced by the same system with mirror 22 removed. In the former instance, all components of the laser beam 15 originally emitted from the gas aligning laser tube 20 are returned to the laser along beam path 15d. Any diminution in the power of this beam is due mainly to attenuation losses consistent with the characteristics of the specific system employed.

It should be further understood that the ordered sequence of alignment operations just cited above for the system depicted in FIGURE 3 need not be adhered to strictly. For instance, an operator may first align mirror 23 with all other components removed from the system with the exception of the gas aligning laser 11 and the detecting apparatus 12 and 14. After mirror 23 has been aligned, beam splitter 21 may be interposed between the gas aligning laser housing 11 and mirror 23 and adjusted until it has been aligned. The operator may then choose to align mirror 22 and then finally the components 17, 18 and 19 of the ruby laser system.

Figure 4:
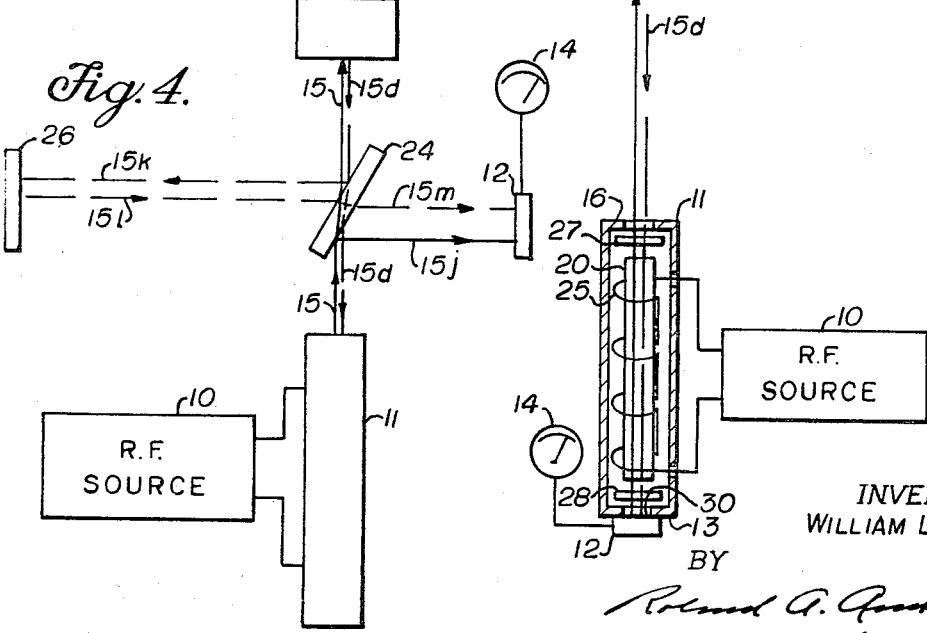
FIGURE 4 depicts an alternate adaptation for the photointensity measuring element of the present invention.

There is, then, little preference in the sequence of alignment so long as at least a portion of the beam employed to align a system component is returned back upon itself and into a photo measuring device of the character described. Also, it is not strictly necessary to locate the photodiode 12 at the rear extremity 13 of gas laser housing 11. One might relocate photodiode 12 and milliwatt meter 14 in a position detached from gas laser housing 11, along with a second beam splitter 24 and a reflecting mirror 26, as represented in FIGURE 4. Beam splitter 24 is positioned between the gas laser housing 11 and a reflecting means 31 adapted for intercepting and returning laser beam 15 back upon itself along beam path 15d into the laser housing 11. Typically, this reflecting means 31 can comprise a simple aligned reflecting mirror or the aligned laser system of FIGURE 3, consisting of components 17, 18, 19, 21, 22 and 23. A portion of laser beam 15 emitted from laser housing 11 will be diverted by beam splitter 24 onto the newly positioned photodiode 12 via beam path 15j. The remaining portion of beam 15 will then be transmitted to the reflecting means 31 and reflected back to beam splitter 24 via beam path 15d, as shown in FIGURE 4. At beam splitter 24, a portion of this returned laser beam will continue on into the gas aligning laser housing 11 via path 15d while the remaining portion of the returned laser beam will be reflected onto photodiode 12 via beam paths 15k, 15l and 15m, reflecting mirror 26 and beam splitter 24. Again, as in the embodiments cited above, optimum alignment of the system is effected by adjusting the system components until a peak power reading appears at milliwatt meter 14.

The alignment methods cited above have particular application in situations where the laser system being aligned requires an aligning beam having a wavelength outside the visible portion of the electromagnetic spectrum. Typical of this particular problem is the situation involving the alignment of a neodymium laser which, for purposes of optimum alignment, requires an aligning beam of 1.06 microns wavelength (1.06 microns is slightly below the visible spectrum). In this instance, visual alignment of the system is not possible, and the present method offers a very accurate and highly reliable means for determining optimum system alignment.

Although the preceding discussion has been made with reference to a detecting means involving the use of a photodiode, several variations from this means are possible. A photomultiplier tube operating in conjunction with a voltmeter or an oscilloscope is one contemplated variation. Furthermore, it is not a strict requirement that the milliwatt meter 14 or similar recording device be kept in close physical contact with the photodetection means (photodiode 12). An operator may, in fact, carry milliwatt meter 14 with him as he adjusts the various system components as long as contact by means of electrical cables is maintained between the photodiode 12 and the milliwatt meter 14.

Although the present invention has been shown and described with reference to a particular embodiment, nevertheless various changes and modifications obvious to one skilled in the art are within the spirit, scope and contemplation of the present invention, and it is intended to cover all such as fall within the scope of the appended following claims.

What is claimed is:

1. Apparatus for use in determining the alignment of components of an optical system comprising:
   (a) laser means for generating a precisely defined coherent light beam and directing said light beam to be reflected from at least one component of said optical system along a return path, including a laser coherent light generating element having front and rear end portions, said front and rear end portions including means to transmit a portion of the coherent laser beam generated by said laser external to the laser; and
   (b) photointensity indicating means spaced from said rear end portion in position to intercept the coherent light beam traveling along said return path and emerging from said rear end of said laser means to provide a peak intensity indication indicating alignment of said optical system component.

2. Apparatus as defined in claim 1, wherein said laser is a continuous operating laser and said photointensity indicating means includes a photodetector disposed to receive light emerging from said rear end of said laser.

3. Apparatus as defined in claim 2, wherein photointensity indicating means is connected to said photodetector.

4. Apparatus as defined in claim 2, wherein said photodetector is a photodiode of precisely defined acceptance area and photointensity indicator means is connected to said photodiode.

References Cited

UNITED STATES PATENTS 3,335,285  8/1967  Gally et al. _____ 88—14

OTHER REFERENCES

L. K. Anderson: "Photodiode Detection," Proceedings of the Symposium on Optical Masers, Polytec Press, New York, 1963, pp. 549–551.

Barry Miller: "Lazer Altimeter May Aid Photo Mapping," vol. 88, No. 13 of Aviation Week & Space Technology, March 29, 1965, pp. 60–64.

RONALD L. WIBERT, *Primary Examiner.*

T. R. MOHR, *Assistant Examiner.*

U.S. Cl. X.R.

356—72